US011804796B2

(12) United States Patent
Kutsuki et al.

(10) Patent No.: US 11,804,796 B2
(45) Date of Patent: Oct. 31, 2023

(54) MOTOR DRIVE SYSTEM AND AIR CONDITIONER

(71) Applicant: Mitsubishi Electric Corporation, Tokyo (JP)

(72) Inventors: Tomohiro Kutsuki, Tokyo (JP); Shinji Sakai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 17/623,702

(22) PCT Filed: Oct. 24, 2019

(86) PCT No.: PCT/JP2019/041744
§ 371 (c)(1),
(2) Date: Jun. 3, 2022

(87) PCT Pub. No.: WO2021/079469
PCT Pub. Date: Apr. 29, 2021

(65) Prior Publication Data
US 2022/0294379 A1    Sep. 15, 2022

(51) Int. Cl.
*H02P 29/028*    (2016.01)
*H02P 27/06*    (2006.01)
*H02P 29/024*    (2016.01)

(52) U.S. Cl.
CPC ............ *H02P 27/06* (2013.01); *H02P 29/028* (2013.01); *H02P 29/0241* (2016.02)

(58) Field of Classification Search
CPC .... H02P 27/06; H02P 29/0241; H02P 29/027; H02P 29/028
See application file for complete search history.

(56) References Cited

U.S. PATENT DOCUMENTS 6,359,408 B1 *  3/2002  Tyckowski ........... H02H 7/0851
                                              318/266
7,791,293 B2 *  9/2010  Nagase ................. H02P 29/027
                                              361/33
(Continued)

FOREIGN PATENT DOCUMENTS

JP          S6419914 A       1/1989
JP       2011166869 A       8/2011
(Continued)

OTHER PUBLICATIONS

International Search Report dated Jan. 21, 2020, issued in corresponding International Patent Application No. PCT/JP2019/041744 (and English Machine Translation).
(Continued)

*Primary Examiner* — Thai T Dinh
(74) *Attorney, Agent, or Firm* — POSZ LAW GROUP, PLC

(57) ABSTRACT

A motor drive system includes: an inverter that drives a motor; a current detector that detects and outputs the first signal that is a current value of a current flowing through the inverter; a first low-pass filter that removes a noise frequency component from the first signal and outputs a second signal that is a current value after the noise frequency component has been removed; a demagnetization current determiner that compares a demagnetization current threshold with the second signal, and outputs a demagnetization protection signal when the second signal takes a value larger than the demagnetization current threshold; and a short circuit determiner that compares a third signal with a short circuit and outputs an anomaly signal for stopping the inverter when the third signal takes a value larger than or equal to the short circuit threshold.

10 Claims, 7 Drawing Sheets

(56) References Cited

U.S. PATENT DOCUMENTS

| | | | | |
|---|---|---|---|---|
| 8,933,653 | B2* | 1/2015 | Ichikawa | H02P 6/00 |
| | | | | 388/811 |
| 9,018,876 | B2* | 4/2015 | Aoki | B62D 5/0484 |
| | | | | 74/388 PS |
| 9,372,236 | B2* | 6/2016 | Lee | G01R 31/343 |
| 9,647,604 | B2* | 5/2017 | Arisawa | H02M 7/53871 |
| 10,547,301 | B1* | 1/2020 | Oda | H02M 1/32 |
| 2011/0031917 | A1* | 2/2011 | Shimizu | H02P 6/14 |
| | | | | 318/400.27 |
| 2013/0082627 | A1 | 4/2013 | Ichikawa et al. | |
| 2018/0345658 | A1 | 12/2018 | Shimono | |

FOREIGN PATENT DOCUMENTS

| | | |
|---|---|---|
| JP | 2013081285 A | 5/2013 |
| JP | 2013192416 A | 9/2013 |
| JP | 2013198235 A | 9/2013 |
| JP | 2018-199314 A | 12/2018 |

OTHER PUBLICATIONS

Office Action dated Nov. 22, 2022 issued in corresponding Japanese Patent Application No. 2021-553237 (and English machine translation).

\* cited by examiner

MOTOR DRIVE SYSTEM AND AIR CONDITIONER

CROSS REFERENCE TO RELATED APPLICATION

This application is a U.S. National Stage application of International Patent Application No. PCT/JP2019/041744 filed on Oct. 24, 2019, the disclosure of which is incorporated herein by reference.

TECHNICAL FIELD

The present invention relates to a motor drive system and an air conditioner, the motor drive system protecting a switching element included in an inverter.

BACKGROUND

As a motor drive system that suppresses power consumption, a motor drive system is known in which a motor is a commutatorless motor, that is, a brushless direct current (DC) motor, and a motor drive unit for driving the motor is an inverter. The commutatorless motor has a longer product life than a commutator motor because there is no commutator wear. Moreover, the commutatorless motor has less power consumption than an induction motor because no current flows through a rotor. The commutatorless motor can thus suppress power consumption and is used in a wide range of products including air conditioners.

For the purpose of protecting the switching element included in the inverter, protecting the motor connected to the inverter, and protecting a power supply connecting the inverter, the inverter generally includes overcurrent detection means that detects an overcurrent.

Patent Literature 1 discloses a motor drive system including protection means that protects a switching element when a large current flows through an inverter, and protection means that protects a power supply from a large current.

Depending on the purpose of protecting the inverter, the motor drive system needs to be provided with a plurality of overcurrent detection means. Among overcurrents generated in the inverter, an overcurrent generated due to a short circuit of the switching element included in the inverter causes a large current to flow in a short period of time. Therefore, when the overcurrent is generated due to the short circuit of the switching element, the inverter should be stopped most quickly. Moreover, in the case where the plurality of overcurrent detection means is provided, it is considered better to combine protection against the short circuit and protection against other currents.

PATENT LITERATURE

Patent Literature 1: Japanese Patent Application Laid-open No. 2013-81285

In the conventional protection against overcurrent, the provision of the plurality of overcurrent detection means requires a plurality of output lines for an anomaly signal. For example, in a case where an anomaly signal is transmitted to a gate drive signal generation circuit of the switching element, a plurality of anomaly signal lines cannot be connected in some cases. Also, in a case where an anomaly signal is transmitted to a microcomputer that is a controller of the motor drive system, the number of ports of the microcomputer is limited so that it is desired in some cases to minimize the number of ports to be used.

SUMMARY

The present invention has been made in view of the above, and an object of the present invention is to provide a motor drive system capable of transmitting an anomaly signal from a plurality of overcurrent detection means by one anomaly signal output line.

To solve the above problems and achieve the object the motor drive system according to the present invention includes: an inverter to drive a motor; a current detector to detect a first signal that is a current value of a current flowing through the inverter, and output the first signal; a first low-pass filter to remove a noise frequency component from the first signal and output a second signal that is a current value after the noise frequency component has been removed; a demagnetization current determiner to compare a demagnetization current threshold that is a current value at which a permanent magnet included in the motor is demagnetized with the second signal, and output a demagnetization protection signal when the second signal takes a value larger than the demagnetization current threshold; and a short circuit determiner to compare a third signal obtained by combining the first signal and the demagnetization protection signal with a short circuit threshold that is less than or equal to a current value of a current flowing when the inverter is short-circuited, and output an anomaly signal for stopping the inverter when the third signal takes a value larger than or equal to the short circuit threshold.

The present invention has an effect of being able to provide the motor drive system capable of transmitting the anomaly signal from the plurality of overcurrent detection means by one anomaly signal output line.

DETAILED DESCRIPTION

A motor drive system and an air conditioner according to embodiments of the present invention will now be described in detail with reference to the drawings. Note that the present invention is not limited to the embodiments.

First Embodiment

Figure 1:
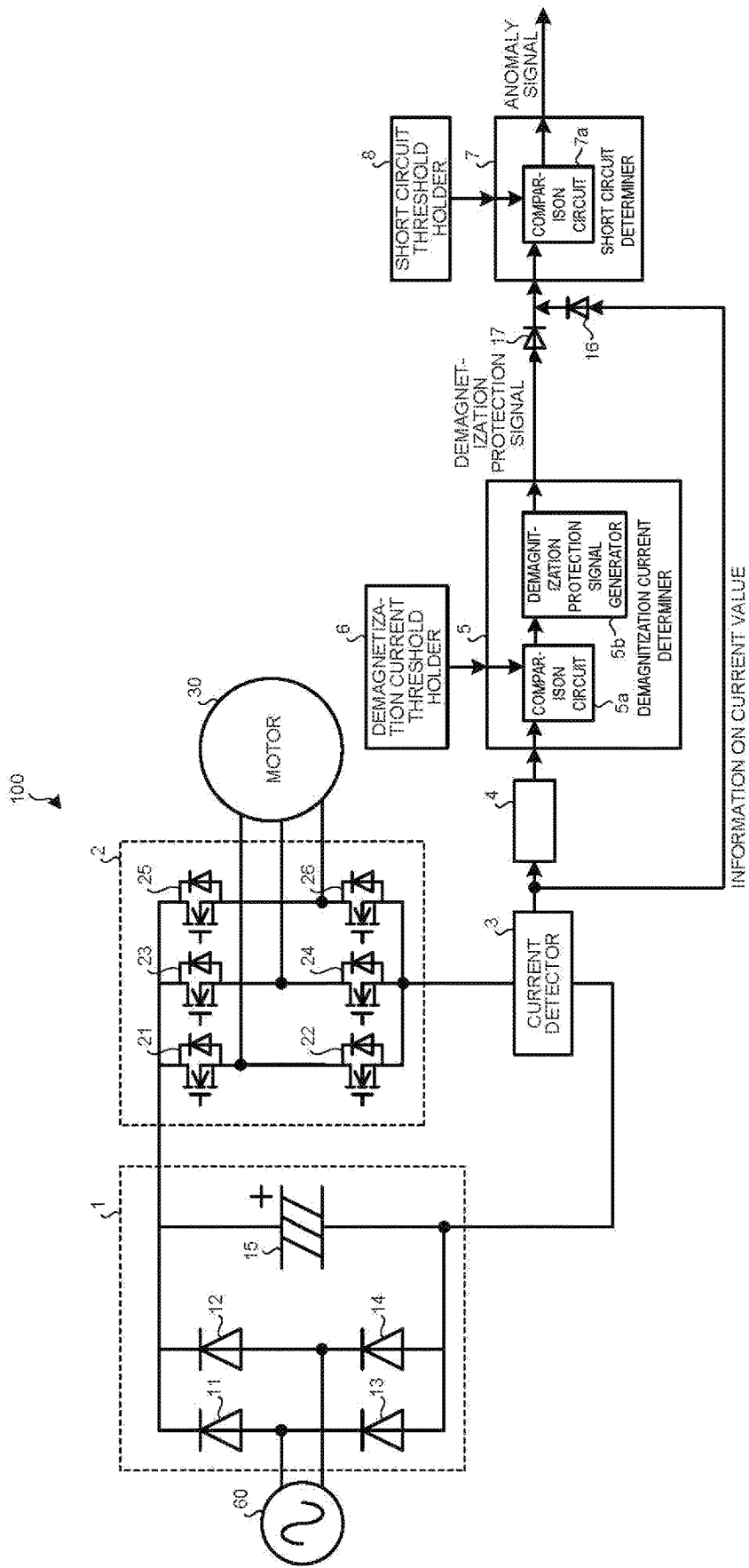
FIG. 1 is a first diagram illustrating a motor drive system according to a first embodiment of the present invention.

FIG. 1 is a first diagram illustrating a motor drive system 100 according to a first embodiment of the present invention. The motor drive system 100 includes a rectifier circuit 1, an inverter 2, a current detector 3, a first low-pass filter 4, a demagnetization current determiner 5, a demagnetization current threshold holder 6, a short circuit determiner 7, and a short circuit threshold holder 8.

The rectifier circuit 1 includes four diodes 11 to 14 connected in a bridge configuration and a capacitor 15. The rectifier circuit 1 rectifies an alternating current voltage output from an alternating current power supply 60 into a direct current voltage using the diodes 11 to 14 and the capacitor 15, and applies the rectified direct current voltage to the inverter 2. The inverter 2 includes six switching elements 21 to 26, converts the direct current voltage into an alternating current voltage, and applies the alternating current voltage to a motor 30. The switching elements 21 to 26 are each referred to as a switching element 20 when not distinguished from one another.

Although the switching elements 21 to 26 are each exemplified as a metal-oxide-semiconductor field-effect transistor (MOSFET) formed of a silicon-based material, the switching elements 21 to 26 are not limited to the MOSFETs and may each be a MOSFET formed of a wide band gap (WBG) semiconductor such as silicon carbide (SiC), gallium nitride (GaN), gallium oxide (Ga2O3), or diamond. Wide band gap semiconductors generally have higher withstand voltage and heat resistance than silicon semiconductors. Therefore, the use of the wide band gap semiconductor for at least one of the switching elements 21 to 26 increases the withstand voltage and the allowable current density of the switching element, and a semiconductor module incorporating the switching element can be downsized.

The current detector 3 is connected to the inverter 2 and detects a current value flowing through the inverter 2. The current detector 3 further outputs information on the detected current value to the demagnetization current determiner 5 via the first low-pass filter 4. The current detector 3 also outputs the information on the current value to the short circuit determiner 7 via a diode 16.

The first low-pass filter 4 removes a noise frequency component from the information on the current value, and outputs the information on the current value after the noise frequency component has been removed to the demagnetization current determiner 5. The demagnetization current determiner 5 uses a demagnetization current threshold and the information on the current value, and outputs a demagnetization protection signal to the short circuit determiner 7 via a diode 17 when the information on the current value is a value larger than the demagnetization current threshold. The demagnetization current threshold holder 6 holds the demagnetization current threshold. The demagnetization current threshold is a current value flowing through the motor 30 when a permanent magnet included in the motor 30 is demagnetized.

The short circuit determiner 7 uses the information on the current value and a short circuit threshold, and outputs an anomaly signal to a drive signal generator (not illustrated) or a controller (not illustrated) that controls the motor drive system 100 when the information on the current value is larger than or equal to the short circuit threshold. The anomaly signal is a signal for controlling the operation of the switching elements 21 to 26 included in the inverter 2, and is output by the short circuit determiner 7 to be able to stop the operation of the inverter 2 in the event of an anomaly in the motor drive system 100. The short circuit threshold holder 8 holds the short circuit threshold. The short circuit threshold is a value less than or equal to the value of current flowing when the inverter 2 is short-circuited.

A hardware configuration of the current detector 3, the demagnetization current determiner 5, the demagnetization current threshold holder 6, the short circuit determiner 7, and the short circuit threshold holder 8 according to an embodiment of the present invention will be described. The demagnetization current determiner 5 and the short circuit determiner 7 are implemented by a resistor, a capacitor, a diode, a comparator, or a combination thereof. The short circuit threshold holder 8 and the demagnetization current threshold holder 6 are implemented by processing circuitry that is an electronic circuit performing each processing.

Figure 2:
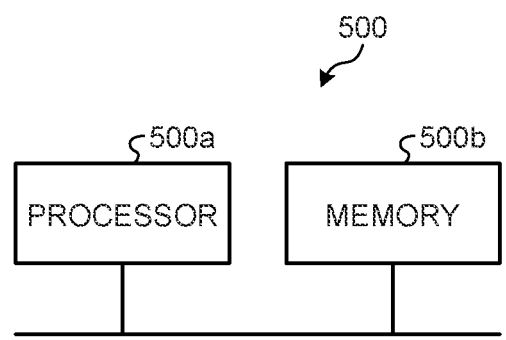
FIG. 2 is a diagram illustrating an example of a configuration of a control circuit according to the first embodiment of the present invention.

The processing circuitry according to an embodiment of the present invention may be dedicated hardware, or a control circuit including a memory and a central processing unit (CPU) that executes a program stored in the memory. The memory in this case corresponds to, for example, a non-volatile or volatile semiconductor memory such as a random access memory (RAM), a read only memory (ROM), or a flash memory. FIG. 2 is a diagram illustrating an example of a configuration of a control circuit 500 according to the first embodiment of the present invention. In a case where the processing circuitry is dedicated hardware, the processing circuitry is, for example, an application specific integrated circuit (ASIC), a field programmable gate array (FPGA), or a combination thereof.

As illustrated in FIG. 2, the control circuit 500 includes a processor 500a as the CPU and a memory 500b. When implemented by the control circuit 500 illustrated in FIG. 2, the demagnetization current determiner 5, the demagnetization current threshold holder 6, the short circuit determiner 7, and the short circuit threshold holder 8 are implemented by the processor 500a reading out and executing a program corresponding to each processing stored in the memory 500b. The memory 500b is also used as a temporary memory for each processing executed by the processor 500a. Note that the demagnetization current determiner 5 and the short circuit determiner 7 may be implemented by the control circuit 500. The current detector 3 is, for example, a current sensor.

An operation of short circuit determination will be described. When any of the switching elements 21 to 26 is short-circuited, for example, when both the switching element 21 and the switching element 22 are turned on at the same time due to a malfunction, the direct current voltage applied by the rectifier circuit 1 is short-circuited. As a result, the current flowing through the inverter 2 increases rapidly. There are two paths for transmitting the information on the current value to the short circuit determiner 7, that is, a path through the first low-pass filter 4 and a path through the diode 16 for preventing backflow. The path through the first low-pass filter 4 has a delay due to the first low-pass filter 4. Therefore, the short circuit determiner 7 performs short circuit determination on the basis of the information of the current received from the path through the diode 16 in which a delay does not occur.

The short circuit determiner 7 compares the information on the current value with the short circuit threshold and outputs the anomaly signal to the drive signal generator or the controller when the information on the current value is larger than or equal to the short circuit threshold, thereby turning off all the switching elements 21 to 26 of the inverter 2 and quickly stopping the operation of the inverter 2. Note that the short circuit threshold is set to a value within a range in which it is guaranteed that the switching element does not fail, that is, within a range of what is called a short circuit safe operating area (SOA). This operation can prevent breakage of the switching element 20 when an unintended short circuit occurs.

Next, an operation of the demagnetization current determiner 5 will be described. Since the motor 30 has inductance, the rate of increase of the current flowing through the motor 30 is lower than the rate of increase of the current flowing at the time of a short circuit of any of the switching elements 21 to 26. Therefore, by causing the information on the current value output from the current detector 3 to pass through the first low-pass filter 4, false detection due to noise of the information on the current value is suppressed.

Figure 3:
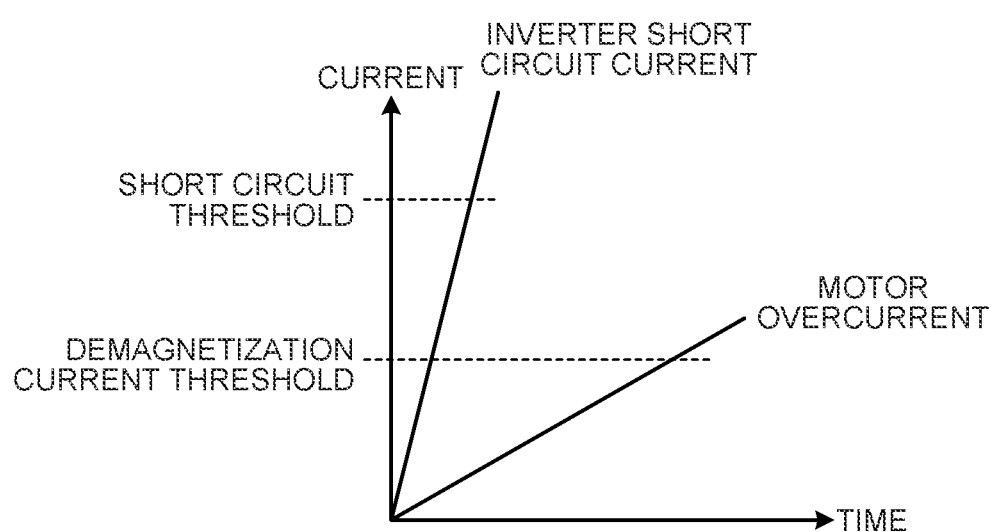
FIG. 3 is a graph illustrating a relationship between a short circuit current value of a switching element and an overcurrent value of a motor according to the first embodiment of the present invention.

FIG. 3 is a graph illustrating a relationship between a short circuit current value of the switching element 20 and an overcurrent value of the motor 30 according to the first embodiment of the present invention. In FIG. 3, the vertical axis represents a current value, and the horizontal axis represents time. As illustrated in FIG. 3, it can be seen that the inverter short circuit current generated by a short circuit of the switching element 20 increases faster than the current value of the motor overcurrent flowing through the motor 30. It can also be seen that the short circuit threshold is larger than the demagnetization current threshold.

In a case where the information on the current value having passed through the first low-pass filter 4 is larger than the demagnetization current threshold, the demagnetization current determiner 5 outputs the demagnetization protection signal to the short circuit determiner 7 via the diode 17. Here, the demagnetization protection signal is output as a value larger than the short circuit threshold and is input to the short circuit determiner 7. As a result, the short circuit determiner 7 outputs the anomaly signal, turns off all the switching elements 21 to 26 included in the inverter 2, and quickly stops the operation of the inverter 2. Note that the demagnetization current threshold is set to be less than or equal to a demagnetization current value of the motor 30. This operation can protect the permanent magnet included in the motor 30 from unintended demagnetization.

Figure 4:
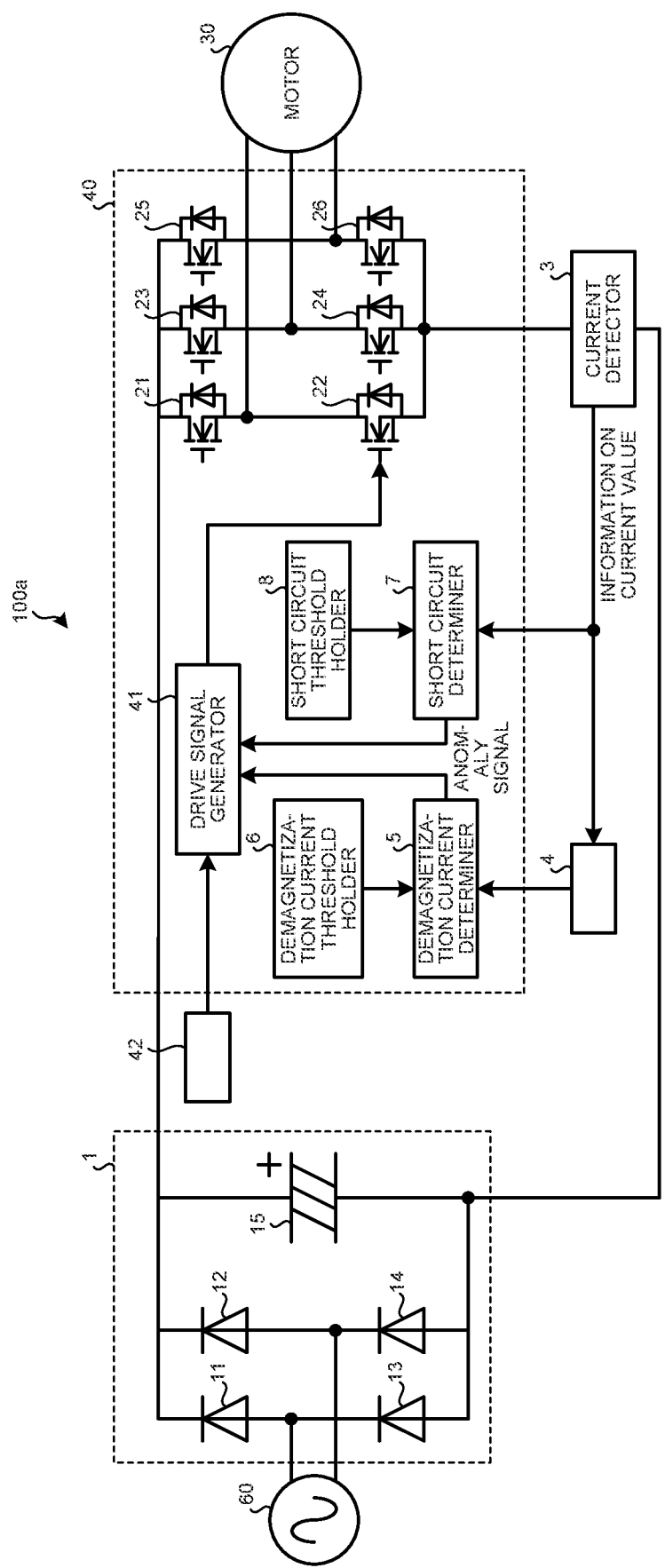
FIG. 4 is a second diagram illustrating a motor drive system according to the first embodiment of the present invention.
Figure 5:
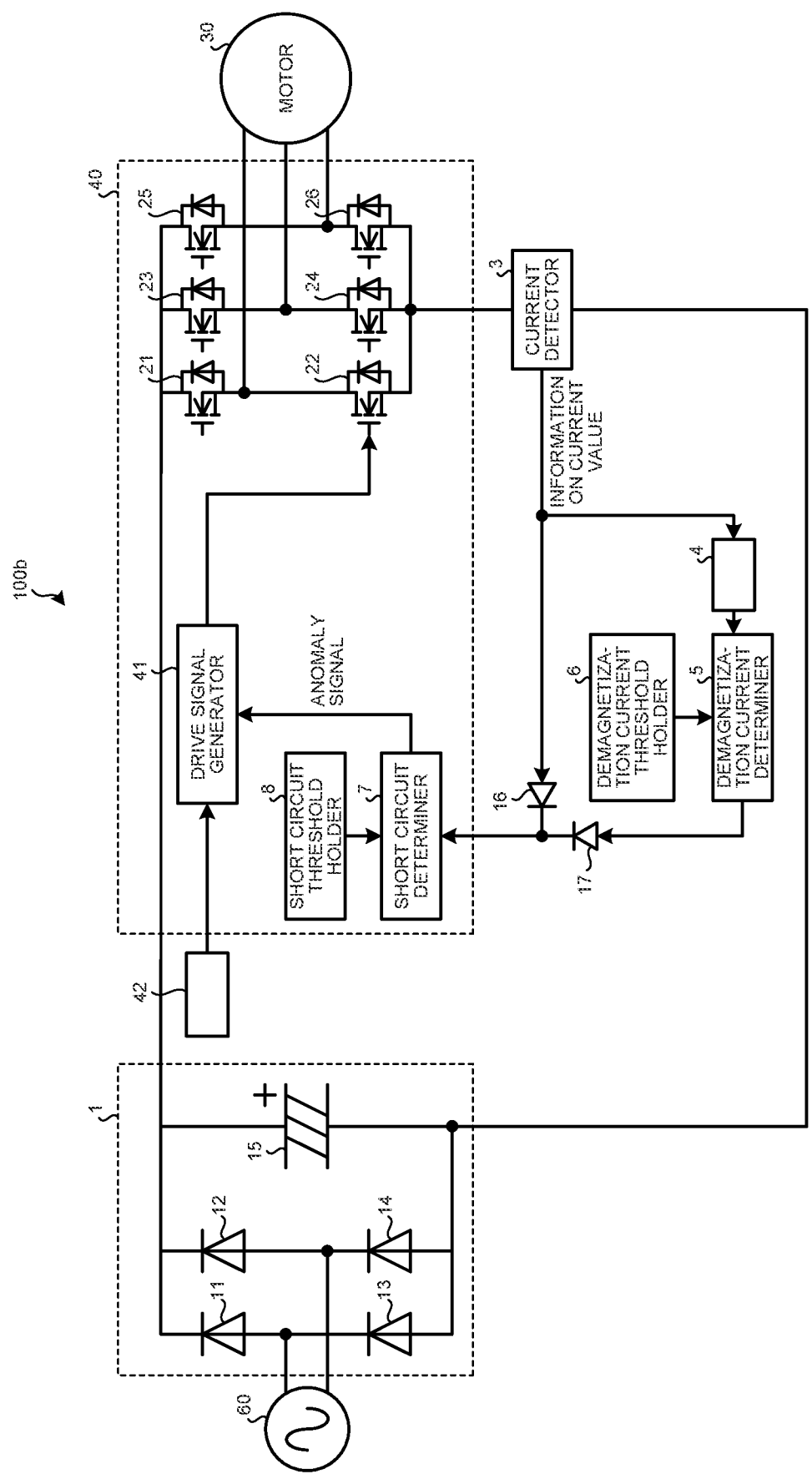
FIG. 5 is a third diagram illustrating a motor drive system according to the first embodiment of the present invention.

FIG. 4 is a second diagram illustrating a motor drive system 100a according to the first embodiment of the present invention. In the motor drive system 100a, the demagnetization current determiner 5, the demagnetization current threshold holder 6, the short circuit determiner 7, and the short circuit threshold holder 8 are included in an inverter module 40 including the inverter 2. In addition, the demagnetization current determiner 5 does not output the demagnetization protection signal to the short circuit determiner 7, but outputs the anomaly signal to a drive signal generator 41. FIG. 5 is a third diagram illustrating a motor drive system 100b according to the first embodiment of the present invention. In the motor drive system 100b, the short circuit determiner 7 and the short circuit threshold holder 8 are included in the inverter module 40. As described above, in the first embodiment, the inverter module 40 may include both or one of the short circuit determiner 7 and the demagnetization current determiner 5 as illustrated in FIGS. 4 and 5. Note that in FIGS. 4 and 5, the short circuit determiner 7 outputs the anomaly signal to the drive signal generator 41. The drive signal generator 41 generates a drive signal under the control of a controller 42.

As described above, in the first embodiment of the present invention, the motor drive system 100 includes: the inverter 2 that drives the motor 30; the current detector 3 that detects a first signal that is the current value of the current flowing through the inverter 2, and outputs the first signal; the first low-pass filter 4 that removes a noise frequency component from the first signal and outputs a second signal that is the current value after the noise frequency component has been removed; the demagnetization current determiner 5 that compares the demagnetization current threshold that is the current value at which the permanent magnet included in the motor 30 is demagnetized with the second signal, and outputs the demagnetization protection signal when the second signal takes a value larger than the demagnetization current threshold; and the short circuit determiner 7 that compares a third signal obtained by combining the first signal and the demagnetization protection signal with the short circuit threshold that is less than or equal to the current value of the current flowing when the inverter is short-circuited, and outputs the anomaly signal for stopping the inverter 2 when the third signal takes a value larger than or equal to the short circuit threshold. Therefore, the motor drive system 100 can implement protection of the switching element 20 when a short circuit occurs and protection of the motor 30 from demagnetization by outputting one anomaly signal.

Second Embodiment

In the first embodiment, the motor drive system 100 is protected from the short circuit current and the demagnetization current. In a second embodiment, in addition to these, a motor drive system 100c protects the inverter module including the inverter 2 from an overcurrent. Note that a component having a function similar to that of the first embodiment will be assigned a reference numeral identical to that assigned to the component in the first embodiment so that a redundant description will be omitted.

Figure 6:
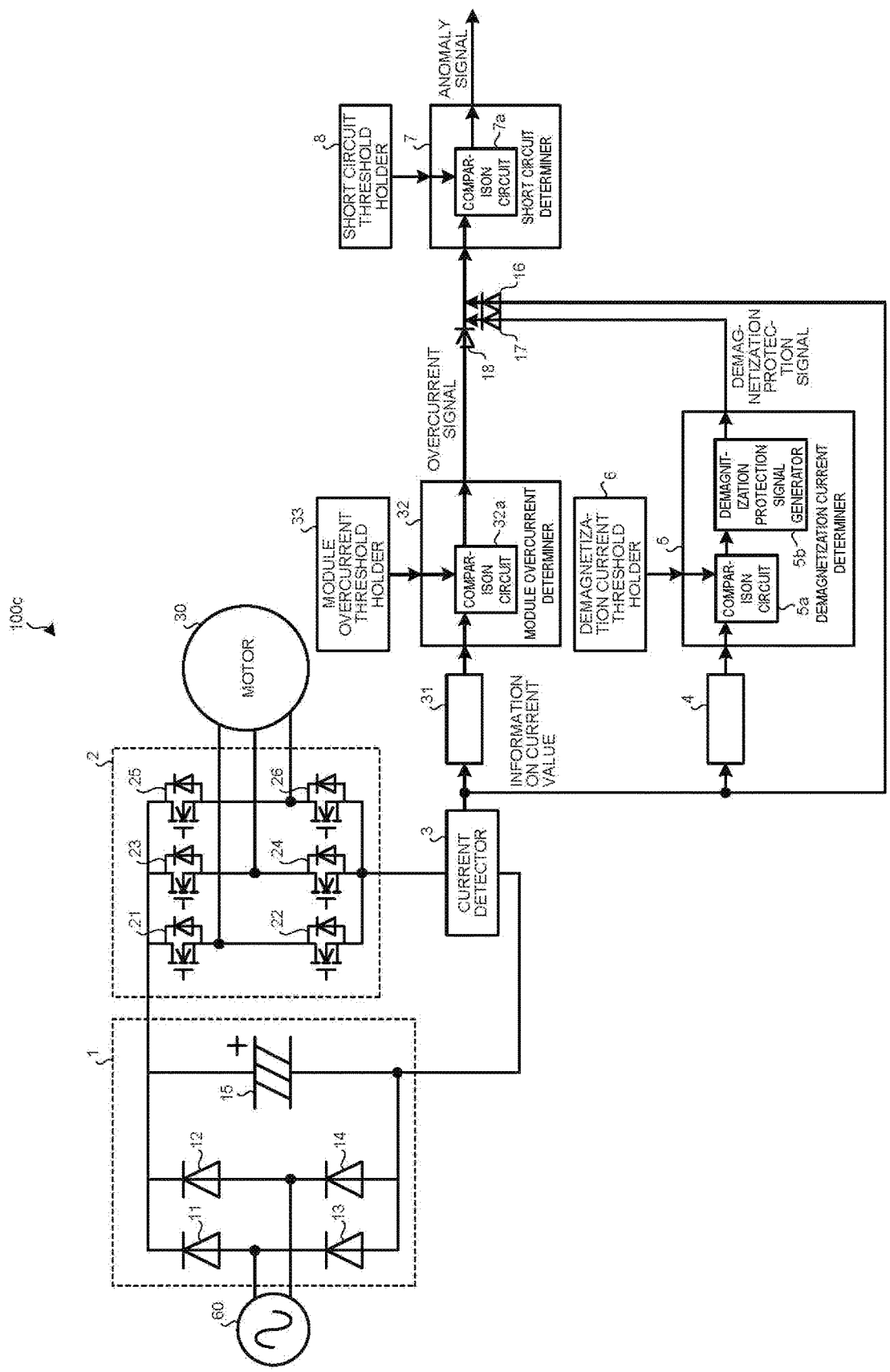
FIG. 6 is a diagram illustrating a motor drive system according to a second embodiment of the present invention.

FIG. 6 is a diagram illustrating the motor drive system 100c according to the second embodiment of the present invention. The motor drive system 100c includes a second low-pass filter 31, a module overcurrent determiner 32, and a module overcurrent threshold holder 33 in addition to the configuration of the first embodiment. The module overcurrent determiner 32 uses information on a current value and a module overcurrent threshold to determine that an overcurrent flows through the inverter module when the information on the current value is larger than the module overcurrent threshold, and outputs an overcurrent signal to the short circuit determiner 7 via a diode 18. The module overcurrent threshold is a current value for determining that an overcurrent flows through the inverter module 40. The module overcurrent threshold holder 33 holds the module overcurrent threshold. The second low-pass filter 31 is connected to a preceding stage of the module overcurrent determiner 32. Moreover, a time constant of the second low-pass filter 31 is larger than a time constant of the first low-pass filter 4.

An operation of the module overcurrent determiner 32 will be described. A rated current value as an upper limit value of a current that guarantees operation is set for the inverter module, and it is basically necessary to pass a current less than or equal to the rated current value to the inverter module. However, even if the current exceeds the rated current value, the inverter module can hold up momentarily. Thus, the rated current value of the inverter module is smaller than the demagnetization current value. When the current rapidly increases to reach the demagnetization current value, there occurs a period in which the rated current of the module is exceeded, but if this period is short, the inverter module can hold up. However, in a case where the period in which the rated current of the module is exceeded is longer than a predetermined period, it is necessary to stop the energization of the inverter 2.

Figure 7:
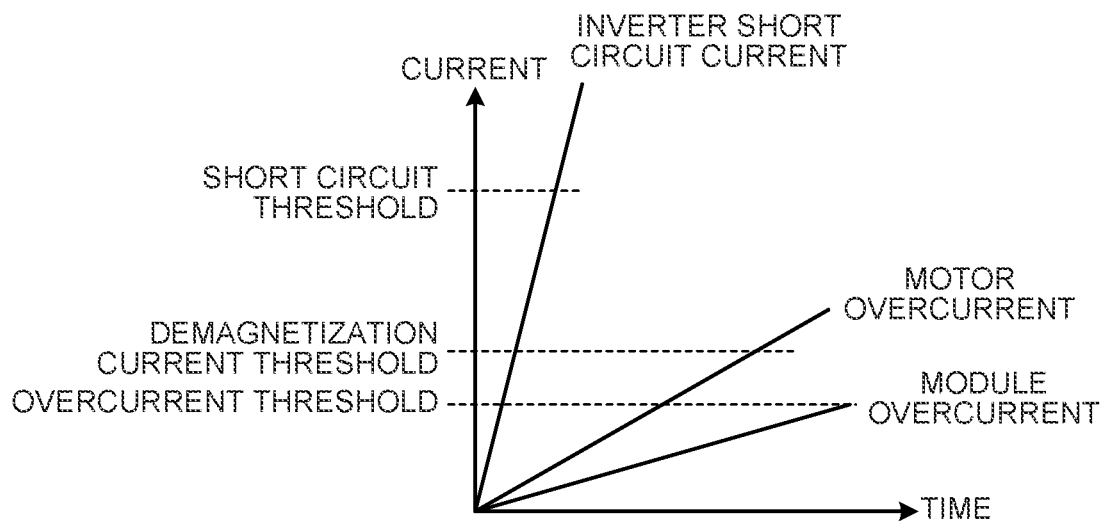
FIG. 7 is a graph illustrating a relationship between a magnitude relationship among values of a short circuit current of an inverter, a demagnetization current of a motor, and a module overcurrent, and time when the inverter is to be stopped according to the second embodiment of the present invention.

FIG. 7 is a graph illustrating a relationship between a magnitude relationship among values of the short circuit current of the inverter 2, the overcurrent value of the motor 30, and the module overcurrent, and time when the inverter 2 is to be stopped according to the second embodiment of the present invention. As illustrated in FIG. 7, it can be seen that the rate of increase of the module overcurrent is slower than that of the current value of the motor overcurrent. It can also be seen that the overcurrent threshold is smaller than the demagnetization current threshold.

Figure 8:
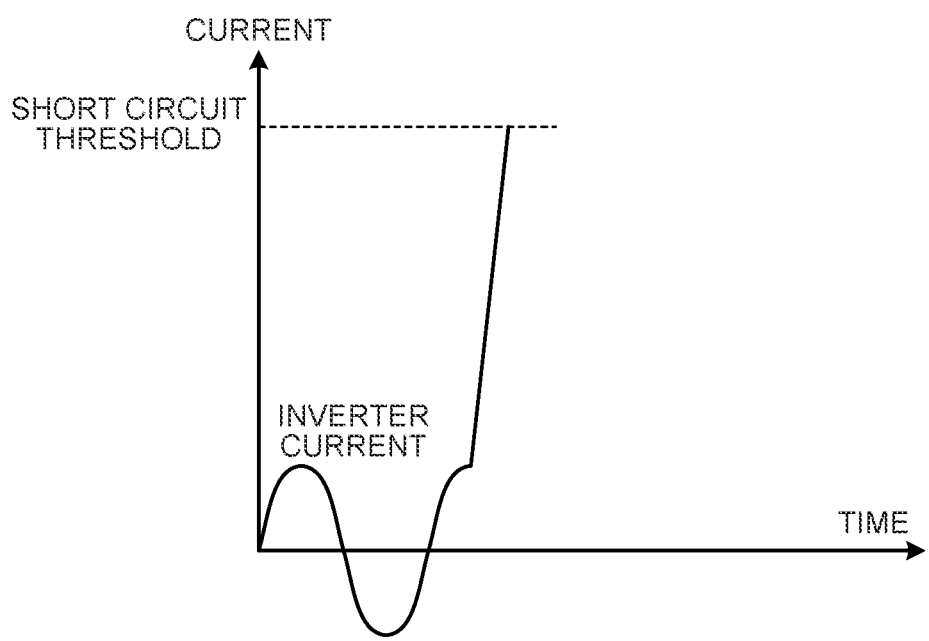
FIG. 8 is a graph illustrating a current value of the inverter when the current value is larger than a short circuit threshold according to the second embodiment of the present invention.
Figure 9:
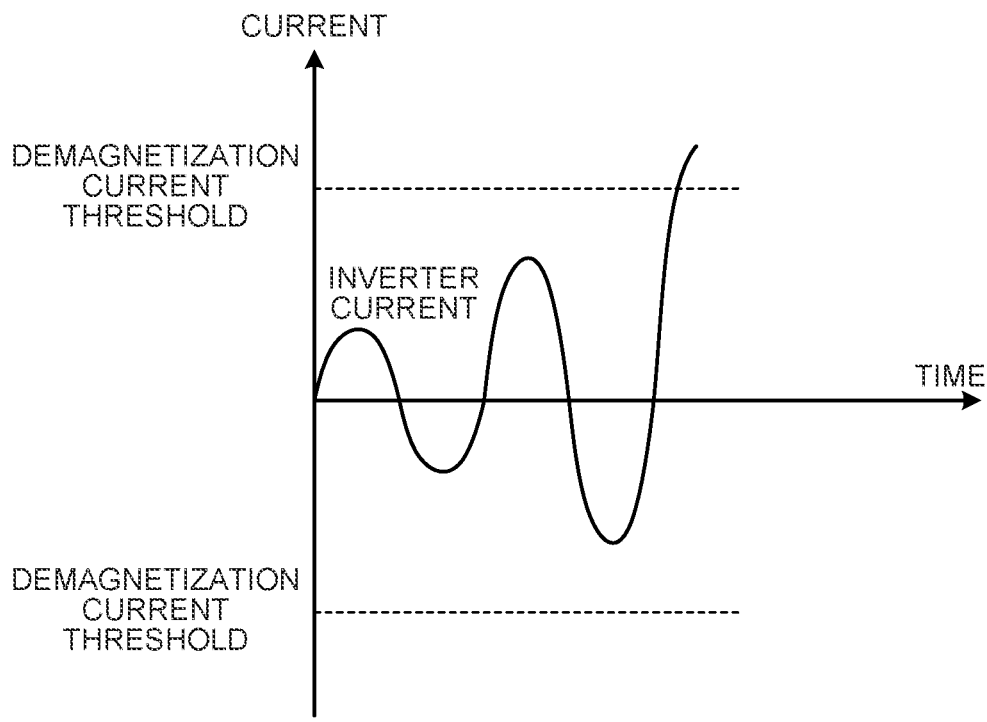
FIG. 9 is a graph illustrating a current value of the inverter when the current value is larger than a demagnetization current threshold according to the second embodiment of the present invention.
Figure 10:
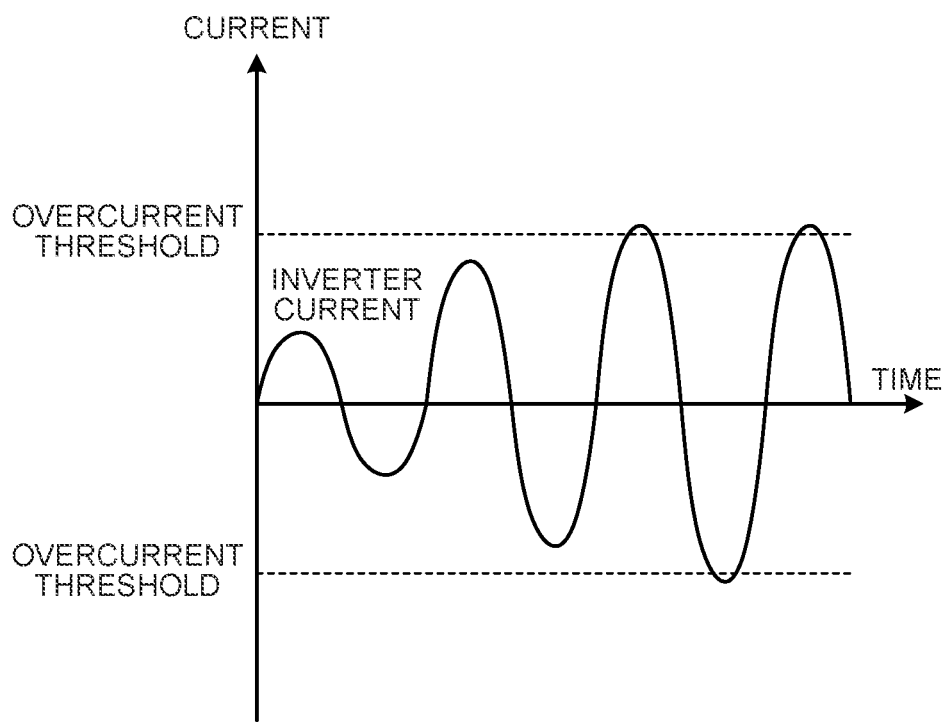
FIG. 10 is a graph illustrating a current value of the inverter when the current value is larger than an overcurrent threshold according to the second embodiment of the present invention.

FIG. 8 is a graph illustrating a current value of the inverter 2 when the current value is larger than the short circuit threshold according to the second embodiment of the present invention. FIG. 9 is a graph illustrating a current value of the inverter 2 when the current value is larger than the demagnetization current threshold according to the second embodiment of the present invention. FIG. 10 is a graph illustrating a current value of the inverter 2 when the current value is larger than the overcurrent threshold according to the second embodiment of the present invention. In each of FIGS. 8 to 10, the vertical axis represents the current value, and the horizontal axis represents time. As illustrated in FIG. 8, when a short circuit occurs, the current value of the inverter 2 rapidly increases to reach the same value as the short circuit threshold at an early stage. As illustrated in FIG. 9, when the current value exceeds the demagnetization current threshold, the current value of the inverter 2 exceeds the demagnetization current threshold while increasing more slowly than when a short circuit occurs. As illustrated in FIG. 10, when the current value exceeds the overcurrent threshold, the current value of the inverter 2 exceeds the overcurrent threshold while increasing slowly.

The second low-pass filter 31 will be described. The time constant of the second low-pass filter 31 is longer than the time constant of the first low-pass filter 4. Thus, the module overcurrent determiner 32 does not output the anomaly signal when the current flowing through the inverter 2 exceeds the module overcurrent threshold for a short time, but the short circuit determiner 7 outputs the anomaly signal when the current exceeds the module overcurrent threshold for a long time.

Since the overcurrent signal output from the module overcurrent determiner 32 is larger than the threshold of the short circuit determiner 7, when the overcurrent signal is input, the short circuit determiner 7 outputs the anomaly signal, turns off all the switching elements 20 of the inverter 2, and quickly stops the operation thereof. In addition to protection against a short circuit and protection against demagnetization, the module can be protected against an overcurrent.

As described above, the motor drive system 100c according to the second embodiment of the present invention includes, in addition to the configuration of the motor drive system 100: the second low-pass filter 31 that has the time constant longer than that of the first low-pass filter 4, removes a noise frequency component from the first signal, and outputs a fourth signal that is a current value after the noise frequency component has been removed; and the module overcurrent determiner 32 that compares the fourth signal with the module overcurrent threshold that is the upper limit value of the current at which operation of the inverter module 40 including the inverter 2 is guaranteed, and outputs the overcurrent signal when the fourth signal takes a value larger than the module overcurrent threshold. The short circuit determiner 7 outputs the anomaly signal for stopping the inverter 2 using the overcurrent signal.

Note that in the first and second embodiments, the module overcurrent determiner 32, the demagnetization current determiner 5, and the short circuit determiner 7 may be configured as a circuit on an electronic substrate. Also, the module overcurrent determiner 32, the demagnetization current determiner 5, and the short circuit determiner 7 or at least one of these determiners may be configured in the microcomputer that is the controller 42 or in the inverter module 40. The circuit area can be cut by configuring the module overcurrent determiner 32, the demagnetization current determiner 5, and the short circuit determiner 7 or at least one of these determiners in the inverter module 40. In addition, by configuring the module overcurrent determiner 32, the demagnetization current determiner 5, and the short circuit determiner 7 or at least one of these determiners in the inverter module 40, the influence of noise from the outside of the inverter module 40 can be suppressed, and noise resistance can be improved.

In the first and second embodiments, the motor 30 connected to the inverter 2 may be one that operates a compressor or a fan of an air conditioner.

The configuration illustrated in the above embodiment merely illustrates an example of the content of the present invention, and can thus be combined with another known technique or partially omitted and/or modified without departing from the scope of the present invention.

The invention claimed is:

1. A motor drive system comprising:
an inverter to drive a motor;
a current detector to detect a first signal that is a current value of a current flowing through the inverter, and output the first signal;
a first low-pass filter to remove a first noise frequency component from the first signal and output a second signal that is a current value after the first noise frequency component has been removed;
a demagnetization current determiner configured to compare a demagnetization current threshold that is a current value at which a permanent magnet included in the motor is demagnetized with the second signal, and output a demagnetization protection signal when the second signal takes a value larger than the demagnetization current threshold, the demagnetization protection signal being larger than a short circuit threshold that is a threshold for detecting a short circuit of the inverter and being larger than the demagnetization current threshold; and
a short circuit determiner configured to
compare a third signal obtained by combining the first signal and the demagnetization protection signal with the short circuit threshold, and output an anomaly signal for stopping the inverter when the third signal takes a value larger than or equal to the short circuit threshold.

2. The motor drive system according to claim 1, further comprising:
a first diode having an anode to which the demagnetization protection signal is input; and
a second diode having an anode to which the first signal is input, wherein
the third signal is a signal obtained by combining an output of a cathode of the first diode and an output of a cathode of the second diode.

3. The motor drive system according to claim 2, further comprising:
a second low-pass filter having a time constant longer than that of the first low-pass filter to remove a second noise frequency component from the first signal and output a fourth signal that is a current value after the second noise frequency component has been removed; and
a module overcurrent determiner to compare the fourth signal with a module overcurrent threshold that is an upper limit value of a current at which operation of an inverter module including the inverter is guaranteed and is smaller than the demagnetization current threshold, and output an overcurrent signal larger than the short circuit threshold when the fourth signal takes a value larger than the module overcurrent threshold, wherein
the short circuit determiner outputs the anomaly signal using a fifth signal obtained by combining the third signal and the overcurrent signal.

4. The motor drive system according to claim 3, further comprising a third diode having an anode to which the overcurrent signal is input, wherein the fifth signal is a signal obtained by combining the output of the cathode of the first diode, the output of the cathode of the second diode, and an output of a cathode of the third diode.

5. The motor drive system according to claim 1, further comprising:
a drive signal generator configured to generate a drive signal to control a plurality of switching elements included in the inverter, wherein
the drive signal generator stops operation of the inverter when the anomaly signal is input.

6. The motor drive system according to claim 5, further comprising:
a controller to control the drive signal generator, wherein
the controller stops operation of the inverter when the anomaly signal is input.

7. The motor drive system according to claim 1, wherein the demagnetization current determiner is included in an inverter module of the inverter.

8. The motor drive system according to claim 1, wherein the short circuit determiner is included in an inverter module of the inverter.

9. The motor drive system according to claim 1, wherein a plurality of switching elements included in the inverter are each a wide band gap semiconductor.

10. An air conditioner comprising the motor drive system according to claim 1.

* * * * *